US009518563B2

(12) United States Patent
Ollgaard

(10) Patent No.: US 9,518,563 B2
(45) Date of Patent: Dec. 13, 2016

(54) METHOD AND DEVICE FOR ALIGNING TOWER SECTIONS

(71) Applicant: Vestas Wind Systems A/S, Aarhus N. (DK)

(72) Inventor: Borge Ollgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/443,265

(22) PCT Filed: Nov. 13, 2013

(86) PCT No.: PCT/DK2013/050376
§ 371 (c)(1),
(2) Date: May 15, 2015

(87) PCT Pub. No.: WO2014/075686
PCT Pub. Date: May 22, 2014

(65) Prior Publication Data
US 2015/0285225 A1    Oct. 8, 2015

Related U.S. Application Data

(60) Provisional application No. 61/727,125, filed on Nov. 16, 2012.

(30) Foreign Application Priority Data

Nov. 15, 2012    (DK) .................................. 2012 70707

(51) Int. Cl.
*F03D 11/04*    (2006.01)
*E04H 12/08*    (2006.01)
(Continued)

(52) U.S. Cl.
CPC ............... *F03D 11/04* (2013.01); *E04F 19/00* (2013.01); *E04H 12/085* (2013.01); *E04H 12/34* (2013.01);
(Continued)

(58) Field of Classification Search
CPC .......... F03D 11/04; F03D 1/001; E04H 12/34; E04H 12/342; E04H 12/085; E04H 2012/006; E04F 19/00; Y02E 10/728
See application file for complete search history.

(56) References Cited

U.S. PATENT DOCUMENTS 2,882,647 A * 4/1959 Tallent .................. C03B 11/127
165/109.1
3,361,456 A * 1/1968 Durand ................. E04H 12/182
403/107

(Continued)

FOREIGN PATENT DOCUMENTS

DE    WO 2015028400 A1 *  3/2015    ............. E04H 12/08
EP    1227204 A1    7/2002
(Continued)

OTHER PUBLICATIONS

International Searching Authority, International Search Report issued in corresponding Application No. PCT/DK2013/050376, dated Feb. 17, 2014, 9 pages.
(Continued)

*Primary Examiner* — Jeanette E Chapman
(74) *Attorney, Agent, or Firm* — Wood Herron & Evans LLP

(57) ABSTRACT

The present invention generally relates to a hollow structural part (2) configured to form part of a wind turbine (1), said structural part (2) having a first end (2') and a second end, with an inwardly directed annular flange (70) at said first end (2'), said flange (70) having a plurality of holes (72), at least
(Continued)

Figure 1A:
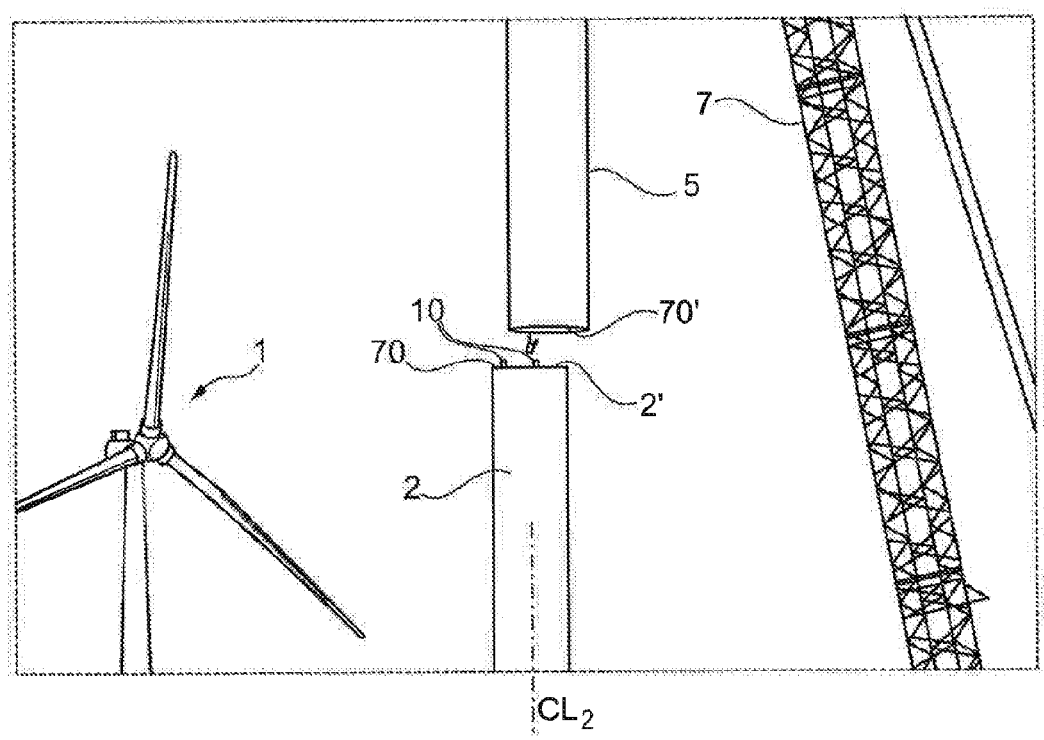

one alignment device (10) being mounted to said hollow structural part (2), a first connector (22) being connected with said structural part (2) to connect said alignment device (10) to said structural part (2), said alignment device (10) having a guide portion (35) with a protracted guiding surface part (38) extending in the general direction away from said opposite second end and towards a centre line (CL) of said hollow structural part (2), said guiding surface part (38) being for directional guiding of another structural part (5) of said wind turbine (1) during assembly thereof, an elongated bar (40) connected with said guide portion (35), said bar (40) having a portion extending from said bottom face (71) of said flange and into one of said holes (72) of said flange, with an end of said bar (40) located within said hole (72), wherein forces on said guide portion (35) are at least in part balanced by lateral forces acting on said portion of said bar (40).

23 Claims, 9 Drawing Sheets

(51) Int. Cl.
*F03D 1/00* (2006.01)
*E04H 12/34* (2006.01)
*E04F 19/00* (2006.01)
*E04H 12/00* (2006.01)

(52) U.S. Cl.
CPC ............ *E04H 12/342* (2013.01); *F03D 1/001* (2013.01); *F03D 13/20* (2016.05); *E04H 2012/006* (2013.01); *Y02E 10/728* (2013.01)

(56) References Cited

U.S. PATENT DOCUMENTS

| | | | |
|---|---|---|---|
| 4,189,892 A | 2/1980 | Smith | |
| 6,568,712 B1 | 5/2003 | Aaron, III | |
| 2003/0147753 A1* | 8/2003 | Ollgaard | E04H 12/085 416/244 A |
| 2009/0142178 A1* | 6/2009 | Nieuwenhuizen | E04H 12/085 415/2.1 |
| 2009/0211174 A1* | 8/2009 | Henderson | E04H 12/182 52/40 |
| 2010/0314884 A1* | 12/2010 | Ollgaard | F03D 11/04 290/55 |
| 2011/0135492 A1* | 6/2011 | Tetambe | F03D 1/001 416/244 R |
| 2011/0239584 A1* | 10/2011 | Tuong | E04H 12/02 52/745.17 |
| 2012/0131876 A1 | 5/2012 | Nies | |
| 2012/0141295 A1* | 6/2012 | Martinez De Castaneda | E04H 12/085 416/244 R |
| 2012/0272614 A1* | 11/2012 | Perner | E02D 27/42 52/745.17 |
| 2013/0001954 A1* | 1/2013 | Maestre | F03D 1/001 290/55 |
| 2013/0115073 A1* | 5/2013 | Thiel | F03D 13/20 415/208.1 |
| 2013/0170987 A1* | 7/2013 | Himmelmann | E04H 12/18 416/9 |
| 2014/0069046 A1* | 3/2014 | Cai | E04H 12/08 52/651.01 |
| 2014/0237932 A1* | 8/2014 | Moestrup | E04H 12/00 52/651.01 |

FOREIGN PATENT DOCUMENTS

| | | | | |
|---|---|---|---|---|
| FR | GB 2493948 A | * | 2/2013 | ............ F03D 1/001 |
| FR | GB 2496129 B | * | 9/2013 | ............ F03D 1/001 |
| GB | 2483677 A | | 3/2012 | |
| GB | 2483678 A | | 3/2012 | |
| GB | WO 2015049520 A1 | * | 4/2015 | ............ E04H 12/00 |
| WO | 2012083831 A1 | | 6/2012 | |

OTHER PUBLICATIONS

Danish Patent and Trademark Office, Search Report issued in corresponding Application No. PA 2012 70707, dated 5 pages.

* cited by examiner

METHOD AND DEVICE FOR ALIGNING TOWER SECTIONS

BACKGROUND OF THE INVENTION

The present invention concerns an alignment device and a structural part configured to form part of a wind turbine and having an alignment device, for directional guiding of another structural part during assembly of the two structural parts.

An alignment device and a structural part of a wind turbine having such an alignment device is already known, wherein the alignment device is secured to a flange of the structural part using a bolt-and-nut connection.

To increase personnel safety the assembly of such structural parts, such as two wind turbine tower sections, should ideally be carried out without any personnel remaining inside the hollow tower section anywhere near the upper end thereof. While this may be possible with the prior art solutions it remains a problem that the alignment devices should also be easy to install and preferably also easy to remove and reuse for the purpose of performing assembly with a next tower section. The alignment device should preferably also allow for the flange of the assembled tower section to bear flatly against the flange of the other tower section.

OBJECT OF THE INVENTION

The present invention sets out to solve the aforementioned problems by providing a novel alignment device and a novel wind turbine structural part having such an alignment device, as well as a method for assembling structural parts of a wind turbine using the novel alignment device, wherein the alignment device is mountable to the bottom face of a flange of the structural part from the inside of the latter, using a dedicated first connector and using pre-existing bolt holes if desired, and wherein a leverage action arising from external loads on the alignment device during the assembly procedure provides temporary forces required to maintain the alignment device in correct position, by using a dedicated second connector.

SUMMARY OF THE INVENTION

More specifically the invention proposes an alignment device with a first connector connected with the structural part to connect the alignment device as such to the structural part, with a guide portion with a protracted surface part for the directional guiding, and with an elongated bar connected with the guide portion and having a bar portion extending into a hole of the structural part, preferably with an end of the bar located within the hole. With this configuration forces applied on the guide portion during the alignment procedure are at least in part balanced by lateral forces acting on the bar portion. Additional such bars may be provided, connected with the guide portion and inserted into adjoining holes or recesses.

The bar may be rigidly connected with the guide portion is various manners, such as by way of an integral connection, whereby the bar will tilt slightly within the hole, to engage to wall of the hole, thereby acting as a lever. Preferably the bar and the corresponding hole have a circular cross-section.

According to an embodiment of the invention wherein the flange is of steel, the first connector is a magnet configured to provide a magnetic attractive force sufficient to support the weight of alignment device.

It is foreseen that three or more alignment devices may be used, being preferably equidistantly spaced along the periphery of the flange. Also, each alignment device may comprise several bars, each taking up a part of the external load on the guiding surface part.

DETAILED DESCRIPTION OF PREFERRED EMBODIMENTS

Figure 1B:
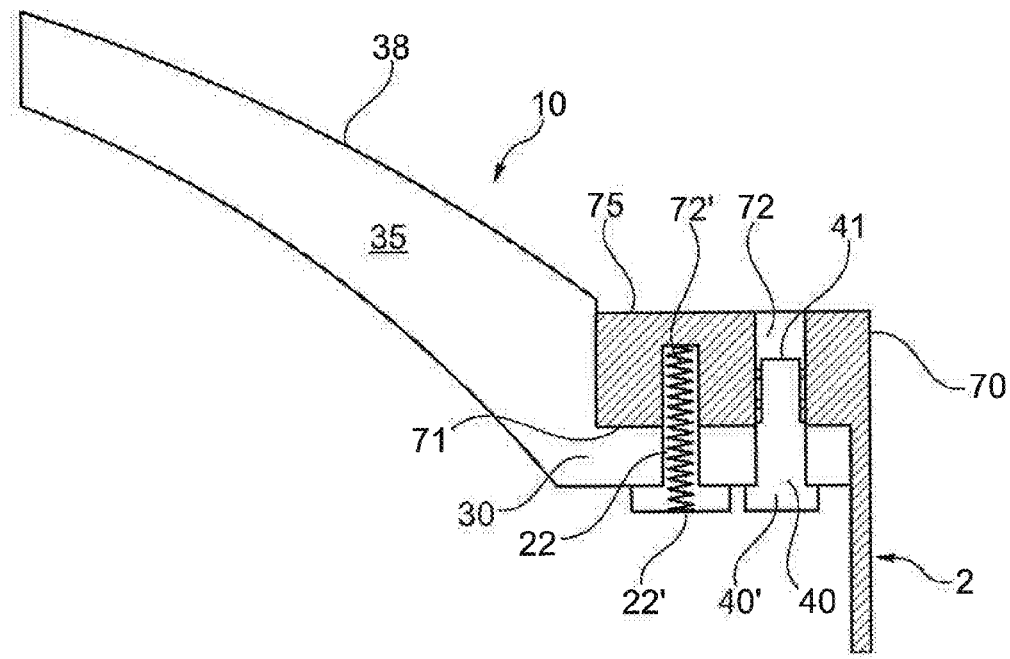
Figure 1C:
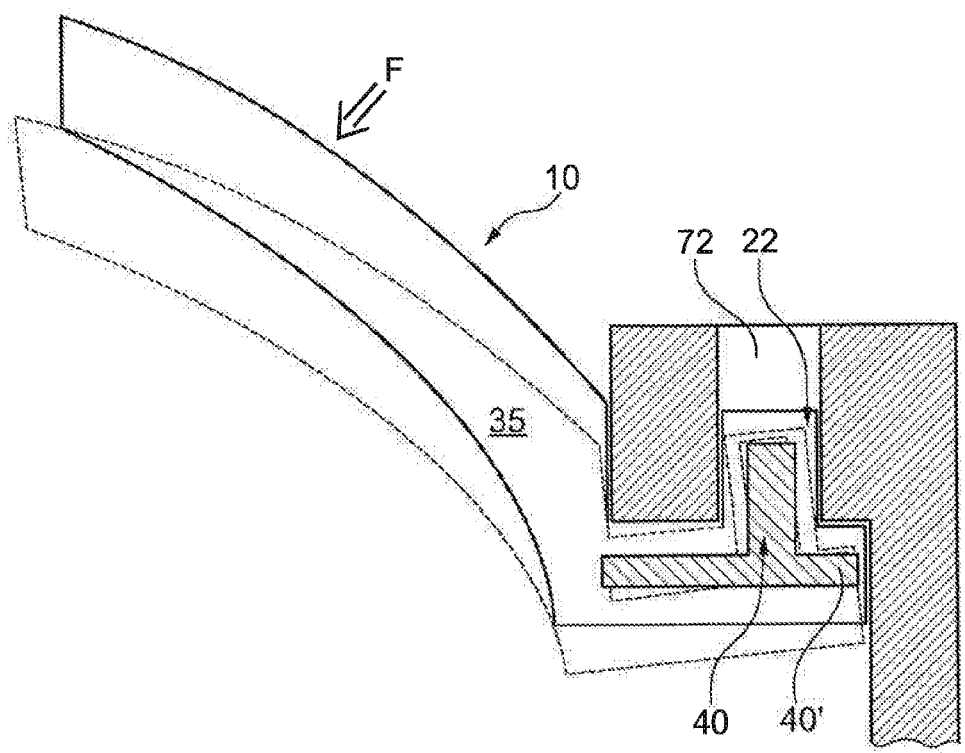
Figure 2:
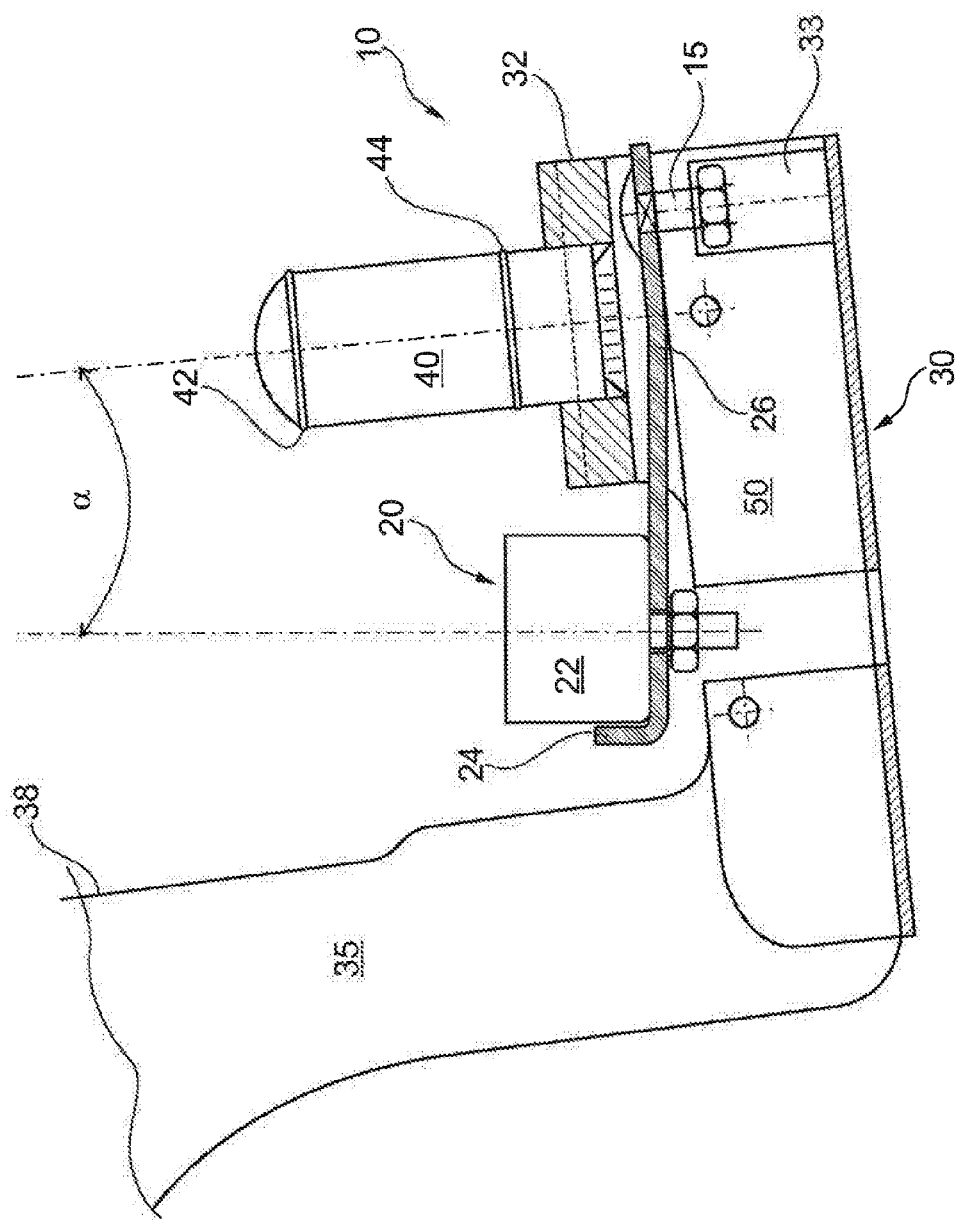
Figure 3A:
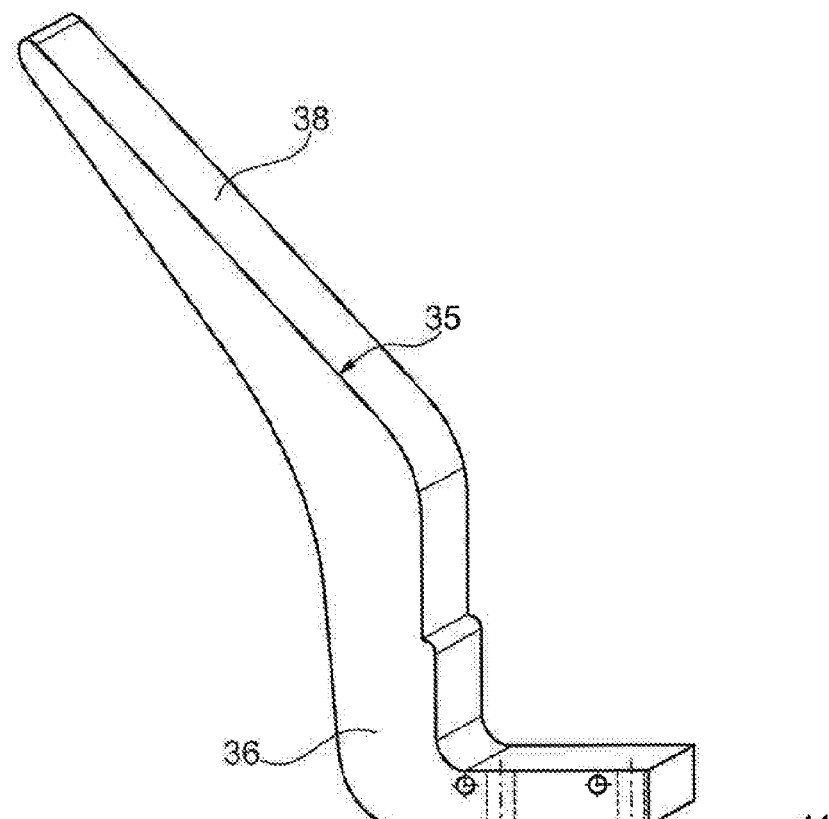
Figure 3B:
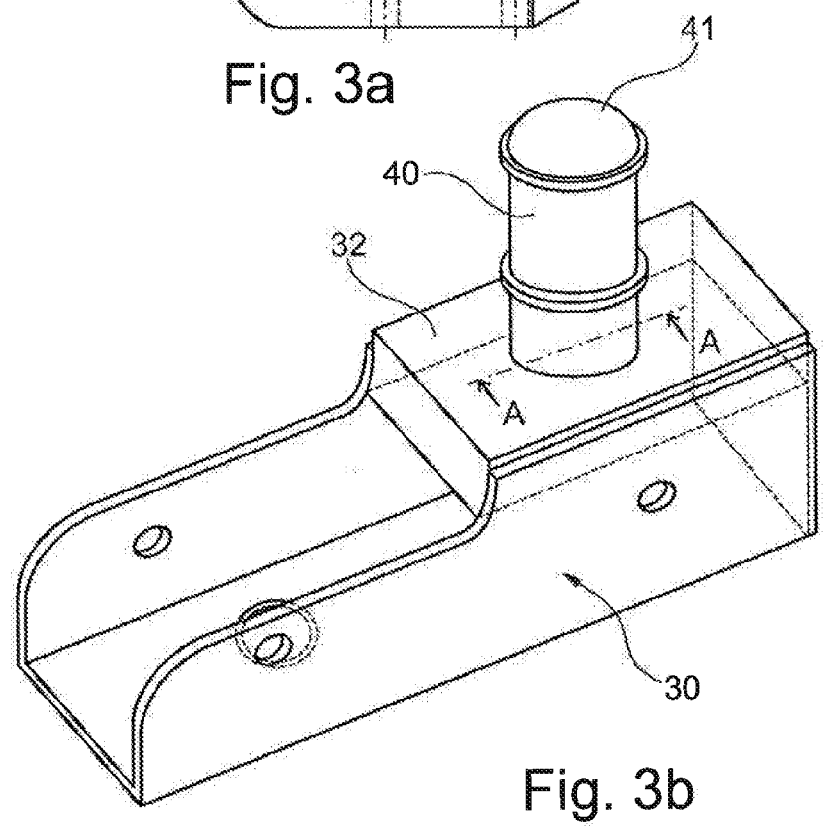
Figure 4:
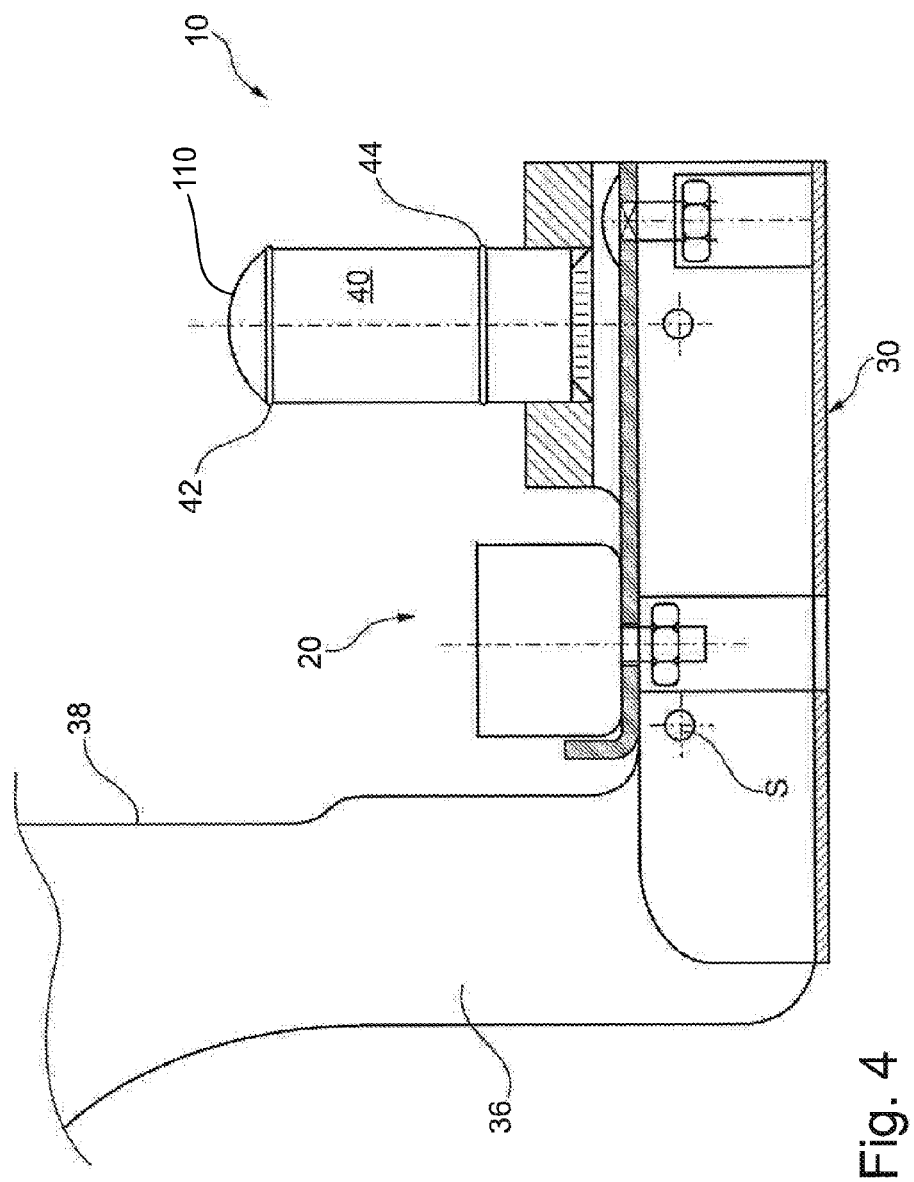
Figure 5:
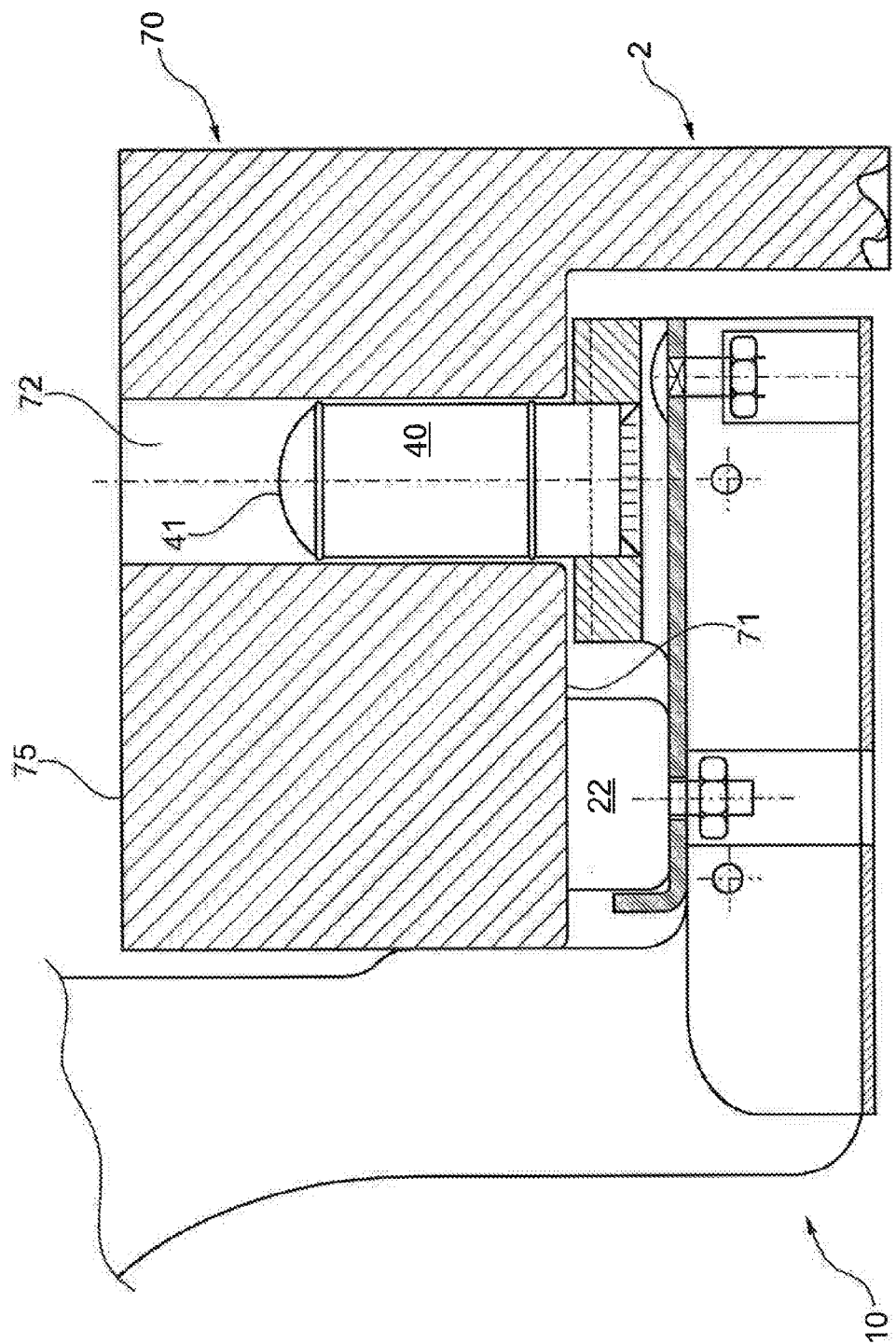
Figure 6A:
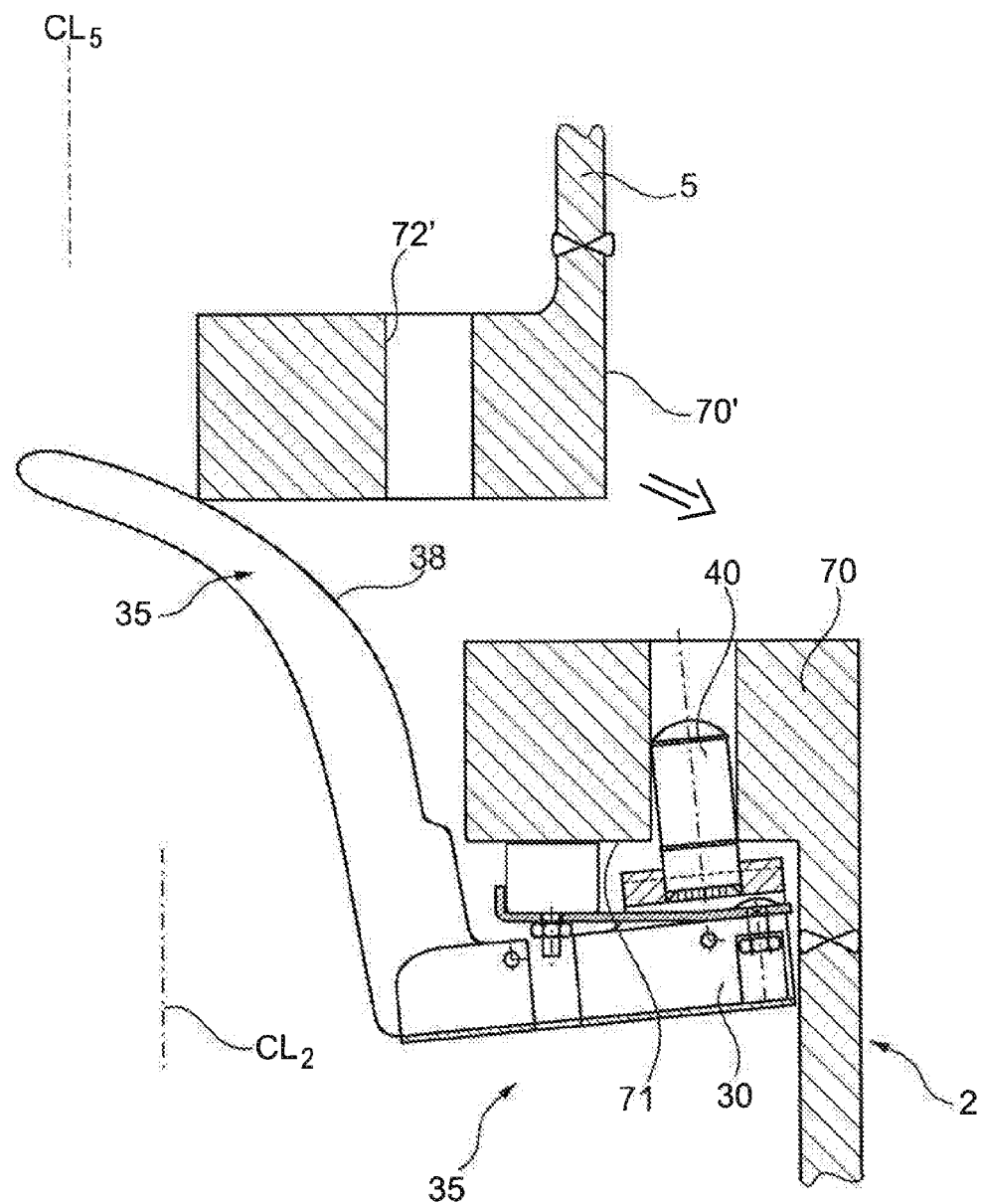
Figure 6B:
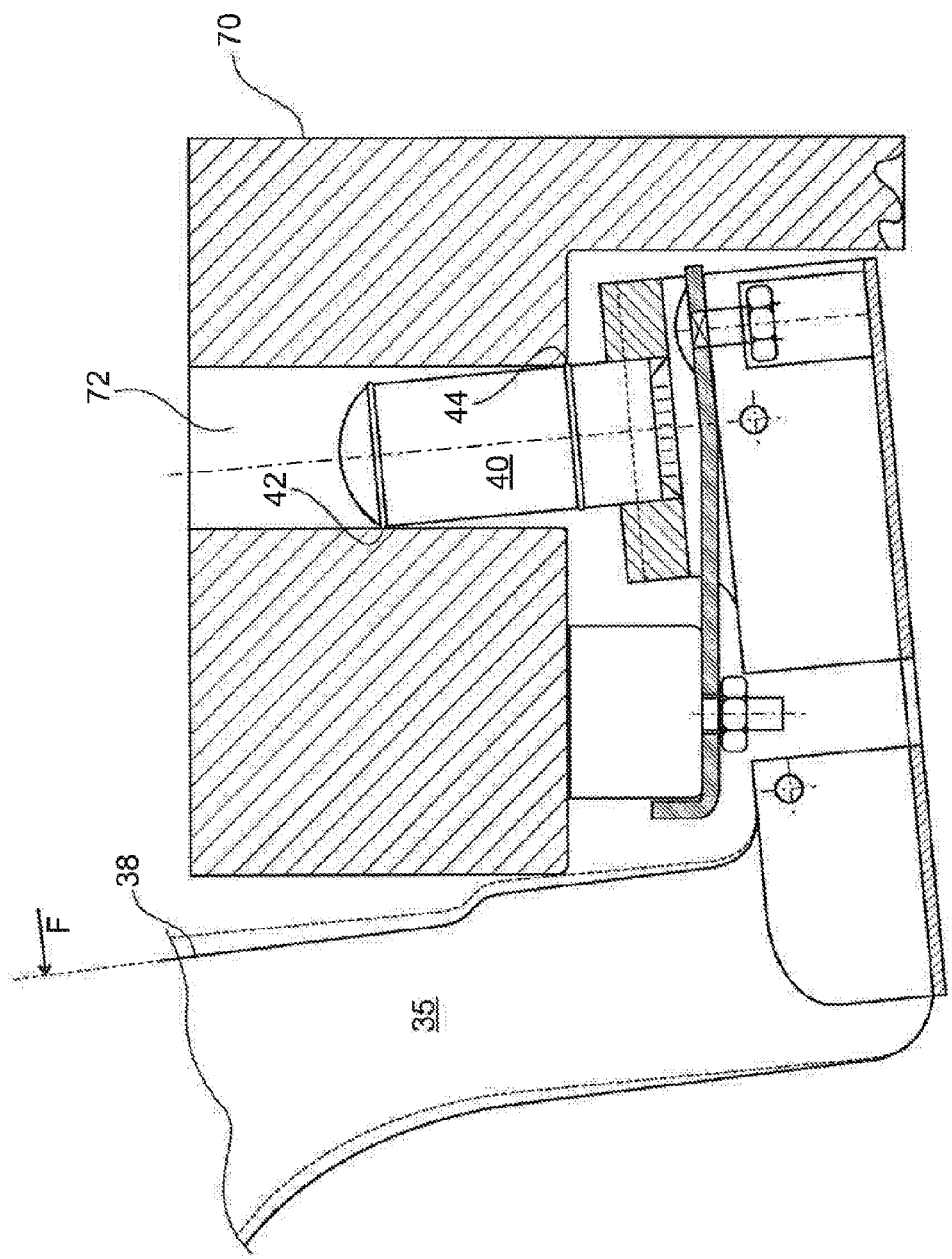
Figure 7:
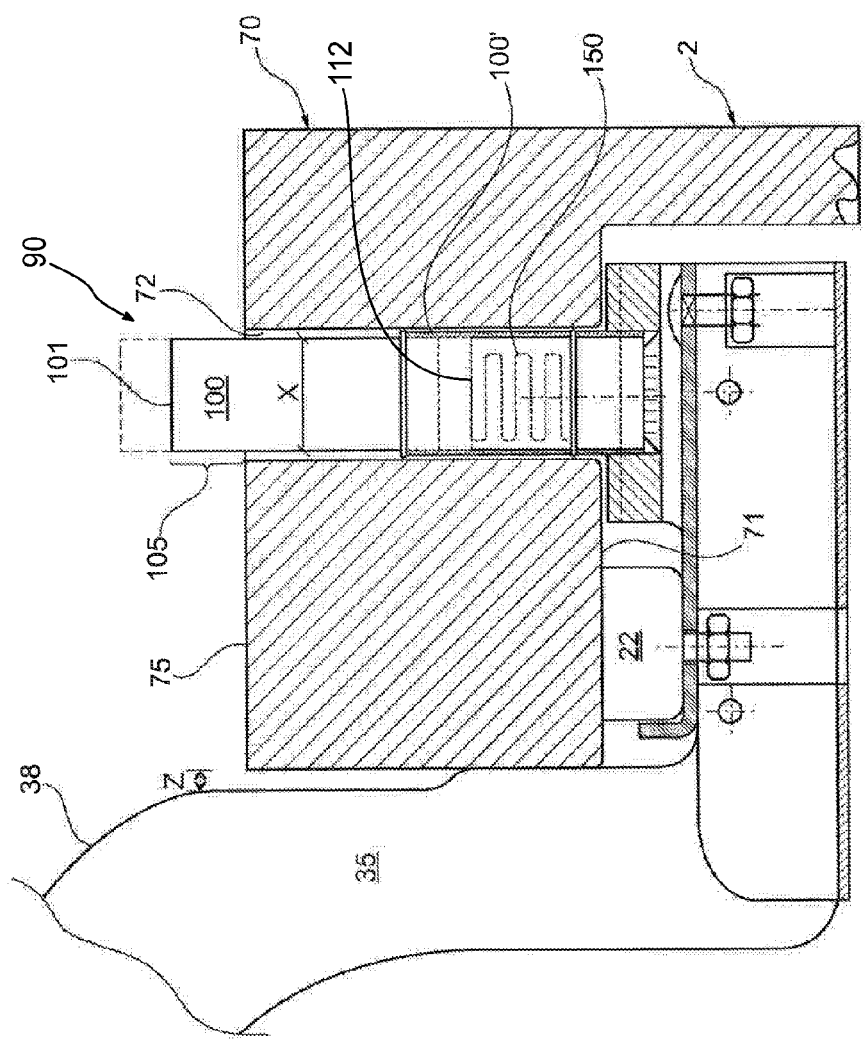

Embodiments of the present invention will now be explained in details with reference to the appended schematic drawings where FIG. 1a is a drawing showing two tower sections of a wind turbine being assembled, FIG. 1b and 1c is a schematic partial cross-sectional side view showing a first and second embodiment of the inventive alignment device, respectively, mounted to a flange of the tower section(shown in part only), FIG. 2 is a schematic partial cross-sectional side view of a third embodiment of the alignment device of the invention, shown in a configuration where a body part is deflected in relation to another body part, FIGS. 3a and 3b show components of one of the body parts shown in FIG. 2, FIG. 4 shows the alignment device of FIG. 2 in a non-deflected configuration, FIG. 5 is a view similar to FIG. 4, showing the alignment device secured to a flange of a tower section, in magnetic engagement therewith, FIG. 6a shows the alignment device of FIG. 5, in the deflected configuration, during assembly of two tower sections, FIG. 6b shows an enlarged size view of the alignment device of FIG. 6a, and FIG. 7 shows the alignment device of FIG. 6b integral with an indicator device.

FIG. 1a shows a lower or first hollow structural part 2 in the form of a tower section configured to form part of a wind turbine 1. A second structural part 5, such as another tower section 5 or the nacelle (not shown) of a wind turbine, is suspended from a crane 7 and is to be connected with the already correctly positioned first structural part 2. For this purpose a plurality of alignment devices schematically illustrated by numeral 10 are mounted to an inwardly oriented peripheral flange 70 along the rim at the upper or first end 2' of the first structural part 2. As discussed below the alignment devices 10 have a guide portion with a protracted guiding surface part which extends upwardly, i.e. in the general direction away from the opposite second end (not shown) of the first structural part 2, generally inwardly towards a centre line $CL_2$ of the hollow structural part 2, and preferably also along a portion of said rim. In this way, on lowering the second structural part 5 towards the first structural part 2 the inside face of a peripheral flange 70' of the second structural part 5 will bear against the guiding surface part 38 and the second part 5 will shift laterally towards the desired position in alignment with the centre line $CL_2$ of the first structural part 2, as shown also in FIG. 6a where centre lines $CL_2$ and $CL_5$ become aligned. The upper structural part 2 is then finally lowered such that the peripheral flange 70' thereof sits on the aforementioned peripheral flange of the first structural part 2. The two structural parts 2, 5 are then connected using bolts extending through aligned holes in the two adjoining flanges 70, 70', if required after a rotation of structural part 5 about its longitudinal centre line.

To increase personnel safety the assembly of two tower sections 2, 5 as shown in FIG. 1a should ideally be carried out without any of the personnel remaining inside the hollow tower section 2 anywhere near to the upper end 2'. In addition, and also for economic reasons, the alignment devices 10 should be easy to install and possibly even to remove and reuse for the purpose of assembling the tower section 5 with a next tower section. The alignment device 10 should also allow for the flange 70' of the upper tower section 5 to bear flatly against the flange 70 of lower tower section 2.

Shown in FIG. 1b-1c is the upper end 2' of the structural part 2 with a first and second embodiment, respectively, of an alignment device 10 according to the invention. The drawings show a guide portion 35 of the alignment device 10 as generally comprising a protracted guiding surface part 38 and a body 30, referred also to in the following as second body 30. The guide portion 35 is mounted to the inwardly directed flange 70 of the structural part 2, with the body 30 bearing against the lower side face 71 of the flange 70 and with the guiding surface part 38 oriented towards the centre line $CL_2$ of the structural part 2, diverging upwardly and away from the flange 70. The guiding surface part 38 and/or body 30 may be made from an elastically flexible plastics material so that lateral forces, such as force F in the general direction indicated in FIG. 1c and arising from an upper tower section 5 striking the guiding surface part 38 during the alignment procedure, will result in some deformation by bending of the guide portion 35, the forces being transferred to the flange 70 by the body 30 being connected to the flange 70 as discussed further below.

The embodiment of FIG. 1b shows the guide portion 35 being installed from below the flange 70 using a first connector indicated by numeral 22, the purpose of which is primarily to secure the connection of the guide portion 35 with the flange 70 in the unloaded condition, i.e. when the guiding surface part 38 is not subjected to any external lateral force F and only the weight of the guide portion 35 is to be supported. The first connector 22 is received in a dedicated hole or bore 72' in the flange 70. The hole 72' opens towards the lower side 71 of the flange 70, i.e. towards the inside of the tower section 2, and the connector 22 extends through an opening formed in the body 30 and further into the hole 72'. The connector 22 may have a head 22' and a shaft portion which may be secured in the hole 72' through a screw thread or an expanding sleeve or dowel (not shown) inserted into hole 72'. By configuring the connector 22 with a length less than the flange 70 thickness this connection leaves the upper surface 75 of the flange 70 without any projecting parts. Removal of the guide portion 35 after the alignment procedure is by unscrewing or pulling out connector 22 using a dedicated tool, such as a craw bar.

Shown in FIG. 1b is also an additional or second connector in the form of a rigid elongated bar 40 which extends from below the flange 70 into one of the through-going holes 72 used for the final bolt-and-nut connection of the two structural parts 2, 5. The protracted guide portion (35) diverges away from the bar 40 which has a head portion 40' bearing against the lower side of body 30, and is inserted into the hole 72 from below the flange 70. The length of the bar 40 is selected such that the upper free end 41 thereof does not extend above the upper face 75 of the flange 70, and the hole 72 is slightly oversized compared to the bolt 40. The bar 40 is not at the outset in direct engagement with the flange 70. Such engagement with the flange 70 arises primarily when the guide portion 35 is subjected to the relatively large external forces F which tend to deform, elastically or not, the guide portion 35 in the manner shown by dashed lines in FIG. 1c. As a result of the aforementioned deformation there will be a tendency for the rigid bar 40 to tilt within the hole 72 whereby the bar 40 is activated to secure the guide portion 35 to the flange 70 by opposite faces of the bar 40 pressing against the inside of hole 72, thus effectively providing somewhat of a wedge-effect preventing withdrawal of the bar 40 from the hole 72.

FIG. 1c shows an embodiment where a bar 40 integral with head 40' is a rigid metal part anchored by overmoulding inside a preferably elastically deformable plastics material body 30, with the first connector 22 integral therewith, to define a rigid connection between the guide portion 35 and the bar 40. First connector 22 is preferably press-fit inside one of the holes 72 used for the subsequent bolt-and-nut connection, and the press-fit supports guide portion 35 is place below the flange 70. On application of a laterally oriented force F bar 40 will turn as shown schematically, giving rise to local forces acting between the wall of hole 72 and the top and root of bar 40, respectively, and balancing the forces on the guide portion 35. Friction resulting from these local forces holds the guide portion 35 to the flange 70 against the relevant component of external force F, the latter being larger than the resistance to withdrawal from hole 72 resulting merely from the above mentioned press-fitting. Insertion and removal of the first connector 22 in the unloaded state of the device 10 can be done using a very simple tool, or even manually, whilst the high local friction resulting from the tilting of the bar 40 when the external force F is being applied provides for a temporary and higher resistance to withdrawal.

FIGS. 2-6b show schematically a third embodiment of the invention. Here, the alignment device 10 includes a first body 20 comprising the first connector 22 and a second body 30 comprising the guide portion 35 and a rigid metal bar 40 which is inserted into a hole of the flange 70. A joint 15, 33 between the first body 20 and the second body 30 allows for the bar 40 to assume different positions in respect to the first connector 22. The first body 20 may be pivotally (not shown) connected with the second body 30, or the first body 20 may as shown include a flexible portion 26 that allows for movement of the bar 40 with respect to the first connector 22 by a flexing of said flexible portion 26. In this embodiment the first connector 22 may conveniently be a magnet to be placed against the lower side of flange 70 as shown in FIG. 5 and the second body may as shown in FIG. 3b comprise a metal structure having the rigid bar 40 welded thereto, to define a rigid connection between the bar 40 and the guide portion 35, and the guide portion 35 with the protracted guiding surface part 38 shown in FIG. 3a rigidly connected thereto by screws S, as indicated schematically in FIG. 4.

FIG. 5 shows how the alignment device 10 is first mounted to the flange 70 from below the flange 70, with the magnet 22 holding the device 10 against the lower face 71 of the flange 70 and supporting the weight of the device 10. FIG. 6a shows how a force F applied onto the guiding surface part 38 during alignment of the 5 second tower structure 5 brings about a turning or tilting movement of bar 40 as the first body 20 deflects at flexible portion 26, such that opposite portions 42, 44, seen better in FIG. 6b, of the bar 40 contact the inner surface of hole 72, thus effectively wedging the bar in place inside hole 72, thereby keeping the alignment device 10 secured to the flange 70 through leverage, providing during alignment a reaction force against the structural part 5 sliding along the protracted guiding surface part 38 as it is lowered by crane 7 shown in FIG. 1*a*.

FIG. 7 shows an embodiment where the alignment device is integral with a bolt hole alignment indicator 90 which may, by suitable design, also assist in the bolt holt alignment by acting to rotate the structural part 5 before it comes to rest against the lower or first structural part 2. The indicator device 90 generally includes a body 100 which is extends in the hole 72 and which has a first body end 101 and an opposite second body end 112, a portion 105 of the body 100 including the first body end 101 projecting from the outer face 75 of the flange 70 in a first configuration of the indicator device 90. The indicator device 90 includes means 150, such as the illustrated spring 150 or a pneumatic system or a hydraulic system, that allows for the indicator device 90 to assume a second configuration wherein the first body end 101 is located closer to the outer face 75. The means 150 are configured to urge the indicator device 90 to assume the first configuration shown in broken lines in FIG. 7.

More specifically, the aforementioned bar 40 is in the embodiment of FIG. 7 formed as a tubular sheath or barrel 100' having inside the aforementioned means 150, in this case in the form of a spring 150, and receiving a portion of the body 100, displaceable therein and configured to extend into a bolt hole 72, with a projecting portion 105. When the displaceable body 100 is in the first configuration of the indicator device 90 stops (not shown) prevent the body 100 from moving further out from the sheath 100'. Preferably, the length of the sheath 100' is such that the body 100 may be depressed into a retracted position where the first or upper end 101 of the body 100 is flush with the upper face 75 of the flange, i.e. where the entire portion 105 is retracted. Although in FIG. 7 the upper end 101 is flat it is preferred that the body 100 has a part 110 (see FIG. 4) tapering towards the upper end 101. In this way the face of the tapering part 110 may serve as a secondary alignment device which will ride against the entry portion of an adjoining hole 72' of the second structural part 5, thus providing a force that tends to align hole 72' with the hole 72 of flange 70, by rotating the second tower section 5 as it is lowered.

The body 100 may alternatively itself be of an elastic material defining as such the means 150 and being mounted to the upper end 41 of the bar 40. A lock (not shown) may be provided for maintaining the indicator device in the first configuration, after having assumed once the second configuration.

It will be understood that in order to connect the two structural part 2, 5 using in addition the alignment indicator the crane operator proceeds by first moving the second structural part 5 towards the first one 2, until contacting the annular flange 70' of the second part 5 with the first body end 101, to bring the indicator device 90 towards the second configuration, at which point the crane operator rotates the upper tower section 5 until the indicator device 90 indicates, such as visually or by an electronic signal being sent to the crane operator, the first configuration, wherein the hole 72 having the indicator device 90 is aligned with a hole 72' of the upper tower section 5 such that it is capable of reassuming the first configuration in that the tip or first end 101 of the body 100 is driven into the aligned hole 72' by the means 150. Rotation may be induced by configuring the body 100 with a tapering part 110 with a conical (see FIG. 4) or spherical shape defining guiding faces.

It is noted that the guide portion 35 may have, near body 30, an increased resistance to bending in a direction perpendicular to the protracted guiding surface part 38. From the above it will be understood that the connection between the bar 40 and the guide portion 35 preferably is rigid or substantially rigid such that forces applied onto the guiding surface part 38 will give rise to transverse forces on the bar 40 received in the hole 72 through leverage. The skilled person will know how to design such a connection and the design proposals given herein, where this desired effect results from the use of an anchored enlarged head portion 40' of the bar 40 or through an integral connection between the bar 40 and the guide part 35, such as by moulding together separate parts as shown in FIG. 1*c*, are merely given as examples. The term bar as used herein refers generally to a relatively long piece of some substance, such as metal, which may have an even or uneven surface. The length of the bar should preferably be selected such that it does not extend above the upper face 75 of the flange and also such that an appropriate leverage results. Several bars 40 engaging adjoining holes 72 may form part of a single alignment device 10, where necessary.

Although the present invention has been described in connection with the specified embodiments, it should not be construed as being in any way limited to the presented examples. In particular, while the term "bar" as used herein may refer to a member having a circular cross-section, members having other cross-sectional configurations may be used; this also applies to the cross-section of the holes, that preferably, however, have a circular or oval/elliptical cross-section. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An alignment device for flange-to-flange alignment of two structural parts of a wind turbine, comprising:
   a first connector configured for being connected with a first one of the two structural parts to secure said alignment device to the first one of the two structural parts;
   a guide portion with a protracted guiding surface part for directional guiding of a second one of the two structural parts during said alignment; and
   a bar rigidly connected with said guide portion, said guiding surface part diverging away from said bar, said bar being capable of assuming different positions by tilting, relative to said first connector.

2. The alignment device of claim 1, said bar having opposite face portions configured for engagement with said first structural part upon a load being applied onto said guide portion.

3. The alignment device of claim 1, including a first body comprising said first connector and a second body comprising said guide portion and said bar.

4. The alignment device claim 3, a joint between said first body and said second body allowing for said bar to assume said different positions.

5. The alignment device according to claim 3, said first body including a flexible portion allowing for said bar to assume said different positions by a flexing of said flexible portion.

6. The alignment device according to claim 1, said first connector being a magnet.

7. The alignment device according to claim 1, said first connector having surface portions configured for frictional engagement with said first structural part.

8. The alignment device according to claim 7, said bar being of metal and located inside said first connector, wherein deformation of said first connector allows for said bar to assume different positions.

9. The alignment device according to claim 1, said guide portion having remote from said protracted guiding surface part an increased resistance to bending in a direction perpendicular to said protracted guiding surface part.

10. The alignment device according to claim 1, an indicator device being connected to said bar for indicating alignment of one of said holes with a hole of a flange of said other structural part, said indicator device including a body having a first body end and an opposite second body end, a portion of said body including said first body end projecting from said top face in a first configuration of said indicator device, said indicator device including means allowing for said indicator device to assume a second configuration wherein said first body end is located closer to said top face, said means urging said indicator device to assume said first configuration.

11. The alignment device of claim 10, wherein said portion is fully received in said one hole in said second configuration.

12. The alignment device of claim 10, said portion having a part tapering towards said first body end, said tapering part defining an alignment face for alignment of said one hole with said hole of a flange of another tower section.

13. The alignment device of claim 12, said tapering part having a conical or dome-shaped configuration.

14. A hollow structural part configured to form part of a wind turbine, comprising:
   an inwardly directed annular flange at a first end, and an opposite second end, said flange having a plurality of holes configured for receiving bolts for connection of said structural part with an annular flange of another structural part of the wind turbine;
   an alignment device including:
      a first connector configured for being connected with said structural part to secure said alignment device to said structural part;
      a guide portion with a protracted guiding surface part for directional guiding of the another structural part during said alignment; and
      a bar rigidly connected with said guide portion, said guiding surface part diverging away from said bar;
   wherein the alignment device is mounted to said inwardly directed annular flange with said first connector secured thereto, said bar extending into a hole of said hollow structural part.

15. The structural part of claim 14, said hole being oversized in relation to said bar to allow for a sideways tilting movement of said bar within said hole.

16. The structural part of claim 14, said bar being rigidly connected with said guide portion.

17. The structural part of claim 14, an indicator device being connected to said bar for indicating alignment of one of said holes with a hole of a flange of said other structural part, said indicator device including a body having a first body end and an opposite second body end, a portion of said body including said first body end projecting from said top face in a first configuration of said indicator device, said indicator device including means allowing for said indicator device to assume a second configuration wherein said first body end is located closer to said top face, said means urging said indicator device to assume said first configuration.

18. The structural part of claim 17, wherein said portion is fully received in said one hole in said second configuration.

19. The structural part of claim 17, said portion having a part tapering towards said first body end, said tapering part defining an alignment face for alignment of said one hole with said hole of a flange of another tower section.

20. The structural part of claim 19, said tapering part having a conical or dome-shaped configuration.

21. The hollow structural part according to claim 14, the length of said bar being selected such that a free end of said bar is located within said hole.

22. The hollow structural part of claim 14, said flange being of steel, said first connector being a magnet configured to provide a magnetic attractive force sufficient to support the weight of said alignment device.

23. The hollow structural part of claim 14, the connection between said first connector and said first structural part being sufficient to support the weight of said alignment device.

* * * * *